United States Patent [19]
Tanaka et al.

[11] Patent Number: 5,528,427
[45] Date of Patent: Jun. 18, 1996

[54] ZOOM LENS

[75] Inventors: Tsunefumi Tanaka, Yokohama; Hideki Ogawa, Choufu; Masahito Kobayashi, Inagi, all of Japan

[73] Assignee: Canon Kabushiki Kaisha, Tokyo, Japan

[21] Appl. No.: 372,832

[22] Filed: Jan. 13, 1995

Related U.S. Application Data

[63] Continuation of Ser. No. 957,099, Oct. 6, 1992, abandoned.

[30] Foreign Application Priority Data

Oct. 30, 1991 [JP] Japan ................. 3-284963

[51] Int. Cl.$^6$ ................. G02B 15/14
[52] U.S. Cl. ................. 359/683; 359/684
[58] Field of Search ................. 359/683, 684

[56] References Cited

U.S. PATENT DOCUMENTS

| | | | |
|---|---|---|---|
| 4,830,477 | 5/1989 | Takahashi et al. | 350/428 |
| 4,840,468 | 6/1989 | Tanaka | 350/427 |
| 4,844,600 | 7/1989 | Tokumaru | 350/427 |
| 4,865,434 | 9/1989 | Matsushita et al. | 350/430 |
| 4,871,243 | 10/1989 | Ogawa et al. | 350/463 |
| 4,896,950 | 1/1990 | Endo et al. | 350/427 |
| 5,042,927 | 8/1991 | Ogawa et al. | 359/683 |
| 5,136,430 | 8/1992 | Hamanishi | 359/684 |

FOREIGN PATENT DOCUMENTS

| | | |
|---|---|---|
| 58-33531 | 7/1983 | Japan . |
| 58-136012 | 8/1983 | Japan . |
| 58-143312 | 8/1983 | Japan . |
| 59-195214 | 11/1984 | Japan . |
| 60-39613 | 3/1985 | Japan . |
| 60-138228 | 7/1985 | Japan . |
| 63-205629 | 8/1988 | Japan . |
| 63-205628 | 8/1988 | Japan . |
| 63-266414 | 11/1988 | Japan . |
| 63-266415 | 11/1988 | Japan . |
| 1154014 | 6/1989 | Japan . |

*Primary Examiner*—Scott J. Sugarman
*Attorney, Agent, or Firm*—Fitzpatrick, Cella, Harper & Scinto

[57] ABSTRACT

A zoom lens having five groups. A first lens group has a positive refractive power; a second lens group has a negative refractive power; a third lens group has a positive refractive power; a fourth lens group has a negative refractive power; and a fifth lens group has a positive refractive power. The first through fifth lens groups are arranged in this order from the object side. A varifocal zooming operation is performed by changing a distance interval between respective lens groups and the second lens group is moved to perform a focusing operation.

6 Claims, 12 Drawing Sheets

ZOOM LENS

This application is a continuation of application Ser. No. 07/957,009 filed Oct. 6, 1992, now abandoned.

BACKGROUND OF THE INVENTION

1. Field of the Invention

This invention relates to a zoom lens, and more particularly, to a zoom lens which is suitable for a still-picture camera, which includes a wide-angle range, and which has a high varifocal ratio.

2. Description of the Prior Art

Recently, zoom lenses have generally been used as interchangeable lenses for single-lens reflex cameras. This tendency is a result of the high performance, size reduction and low price of zoom lenses. Zoom lenses which have greater varifocal ratios, and which are even more compact, hereafter also will be required. In the field of compact cameras, where lenses are built into the camera, zoom lenses which have greater varifocal ratios and which are more compact also will be required.

Furthermore, in accordance with the popularity of autofocus cameras, optical systems suitable for an autofocusing operation also are required. Hence, it has become required that the amount of movement, weight, diameter and the like of a focus-moving lens have smaller values.

Zoom lenses having high varifocal ratios mainly are used for single-lens reflex cameras and have been disclosed, for example, in Japanese Patent Publication No. 58-33531 (1983) and Japanese Patent Laid-open Application (Kokai) Nos. 59-198214 (1984) and 60-39613 (1985). So-called rear-focusing zoom lenses, in which focusing is performed by lens groups other than the front lens group also have been disclosed, for example, in Japanese Patent Laid-open Application (Kokai) Nos. 58-136012 (1983); 58-143312 (1983); 61-138228 (1986); 63-205628 (1988); 63-205629 (1988); 63-266414 (1988); 63-266415 (1988) and 1-154014 (1989).

These zoom lenses have the configuration of five groups having positive, negative, positive, negative and positive refractive powers, arranged from the object side, in order to efficiently perform a varifocal operation and to provide a small size. However, these efficiencies are still insufficient. While the diameter of a front lens can be reduced by adopting a rear-focusing configuration, such a configuration is so complicated that the response speed of an autofocusing operation becomes insufficient.

SUMMARY OF THE INVENTION

It is an object of the present invention to overcome the above-described problems in the prior art.

It is another object of the present invention to provide a zoom lens which has a high varifocal ratio including a wide-angle range, which is compact, and which has a high optical performance.

It is still another object of the present invention to provide a zoom lens which can perform a prompt autofocusing operation.

According to one embodiment, the present invention achieves these objectives through a five group zoom lens comprising in order from the object side, a first lens group having a positive refractive power; a second lens group having a negative refractive power; a third lens group having a positive refractive power; a fourth lens group having a negative refractive power; and a fifth lens group having a positive refractive power, wherein a varifocal zooming operation is performed by changing a distance interval between respective lens groups, and wherein certain conditional expressions (to be described later) also are satisfied.

DESCRIPTION OF THE PREFERRED EMBODIMENTS

An explanation will now be provided of five group zoom lenses according to preferred embodiments of the present invention, with reference to the accompanying drawings.

Figure 1:
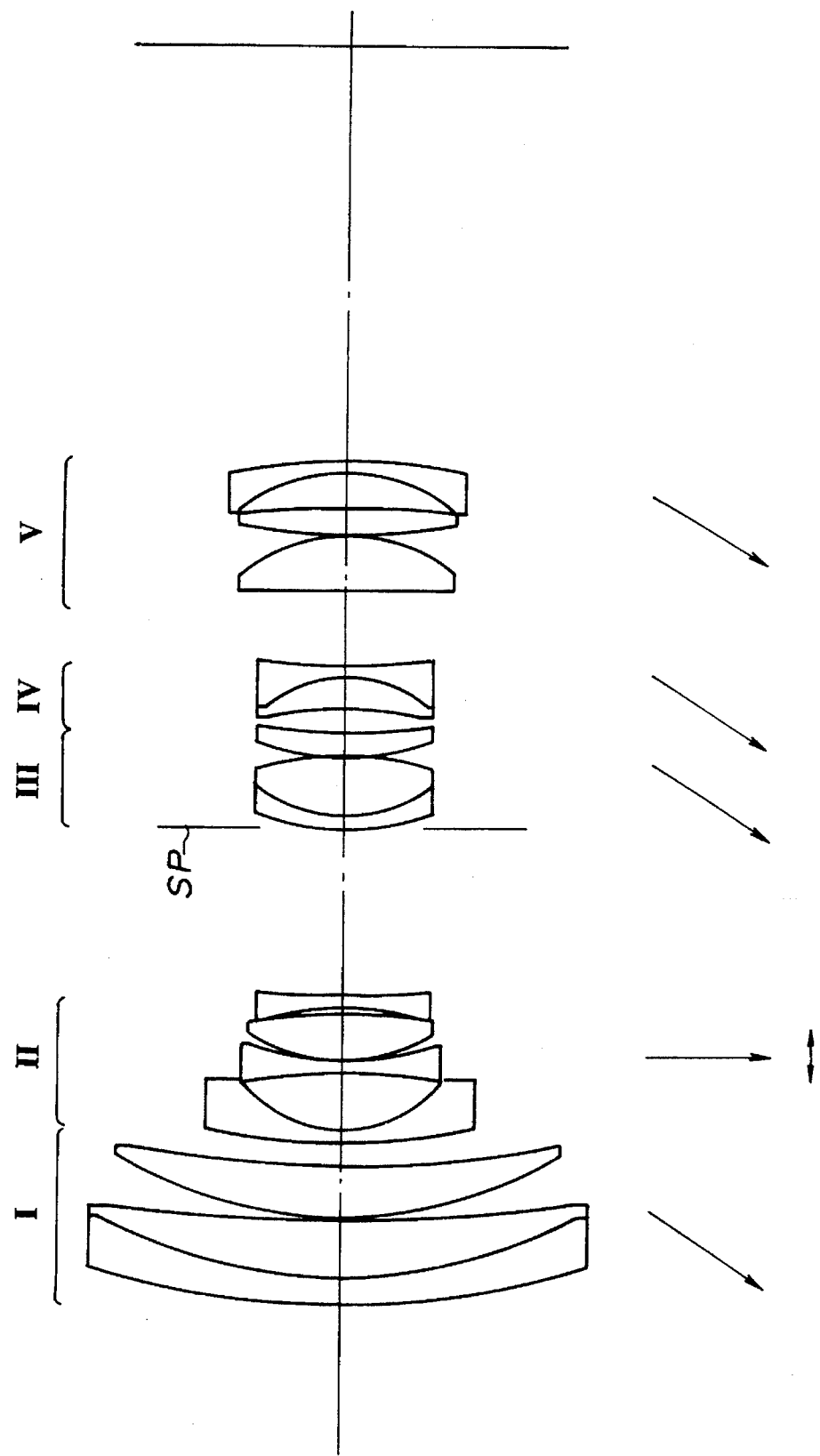
FIG. 1 is a cross-sectional view of a lens according to a first embodiment of the present invention.
Figure 2:
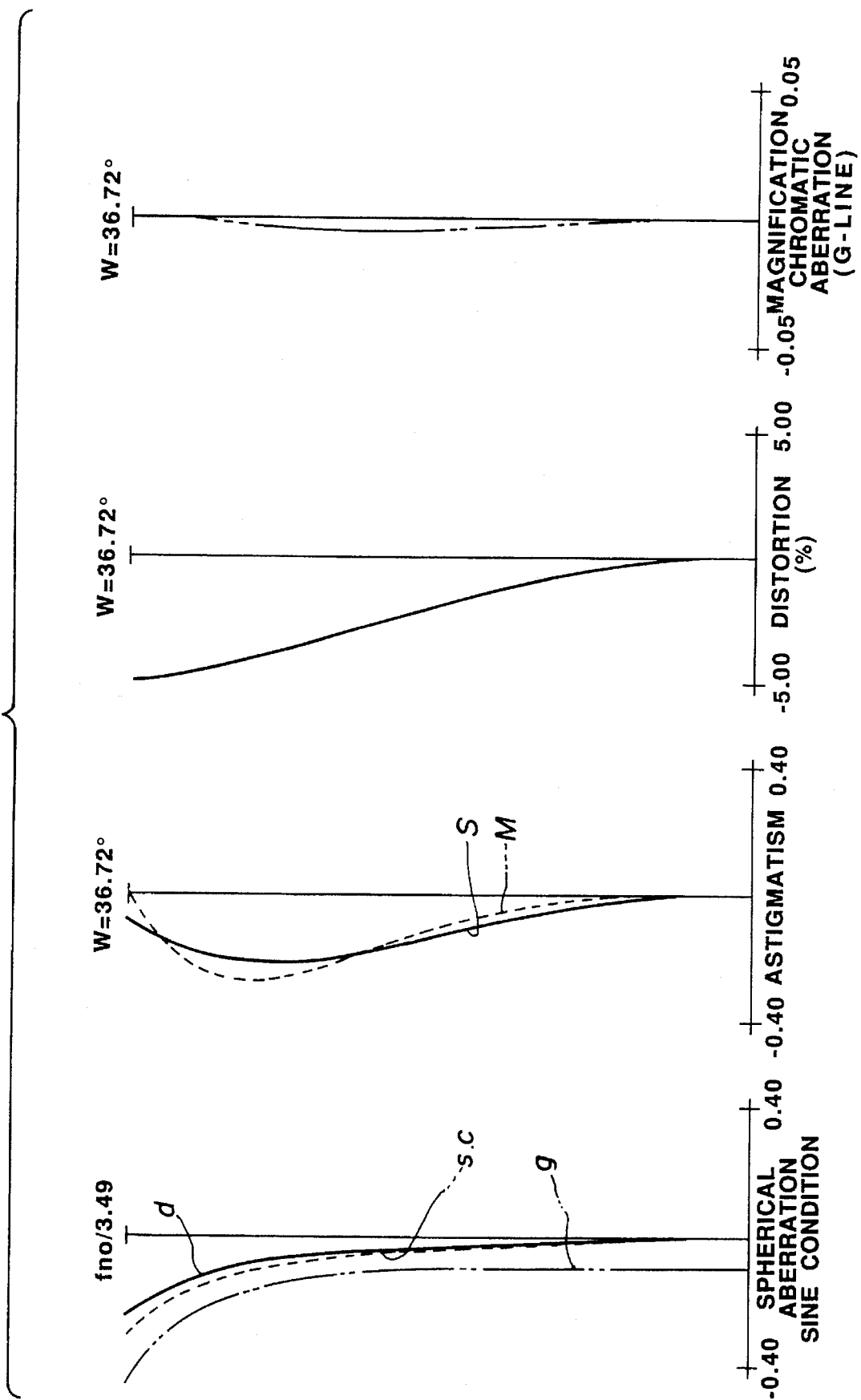
FIG. 2 is a diagram illustrating various kinds of aberrations at a wide-angle end of the lens of the first embodiment.
Figure 3:
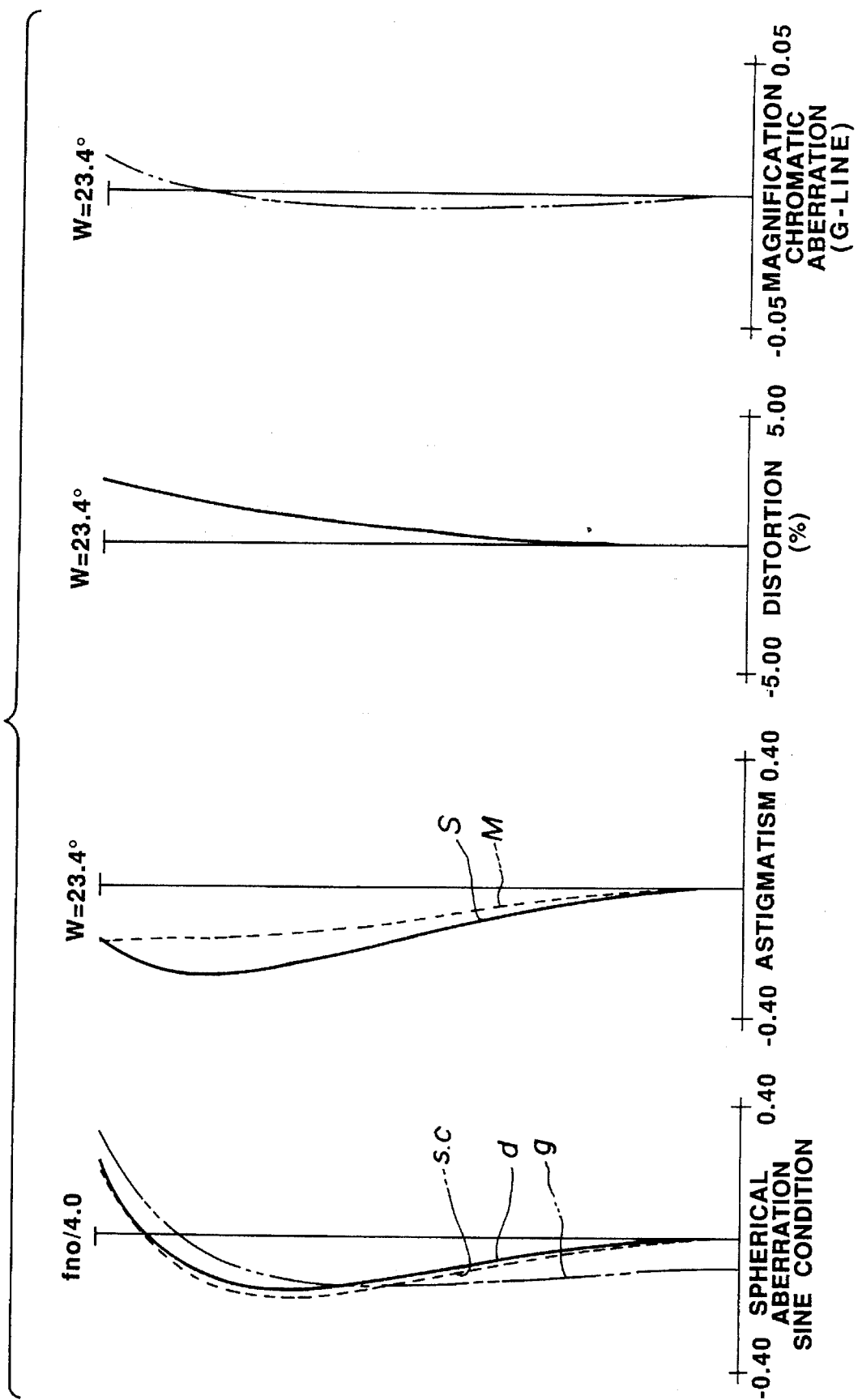
FIG. 3 is a diagram illustrating various kinds of aberrations at an intermediate focal length of the lens of the first embodiment.
Figure 4:
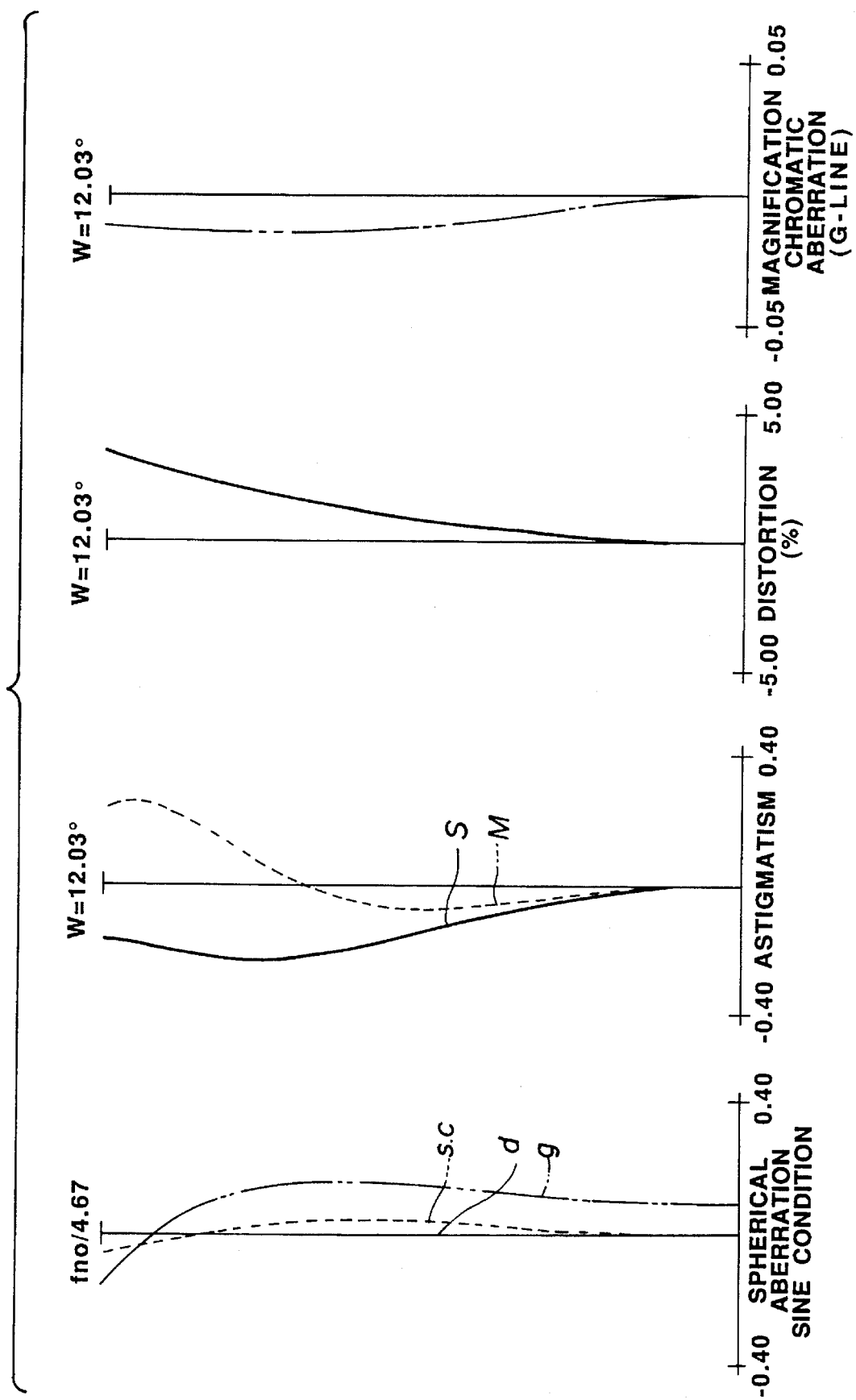
FIG. 4 is a diagram illustrating various kinds of aberrations at a telephoto end of the lens of the first embodiment.
Figure 5:
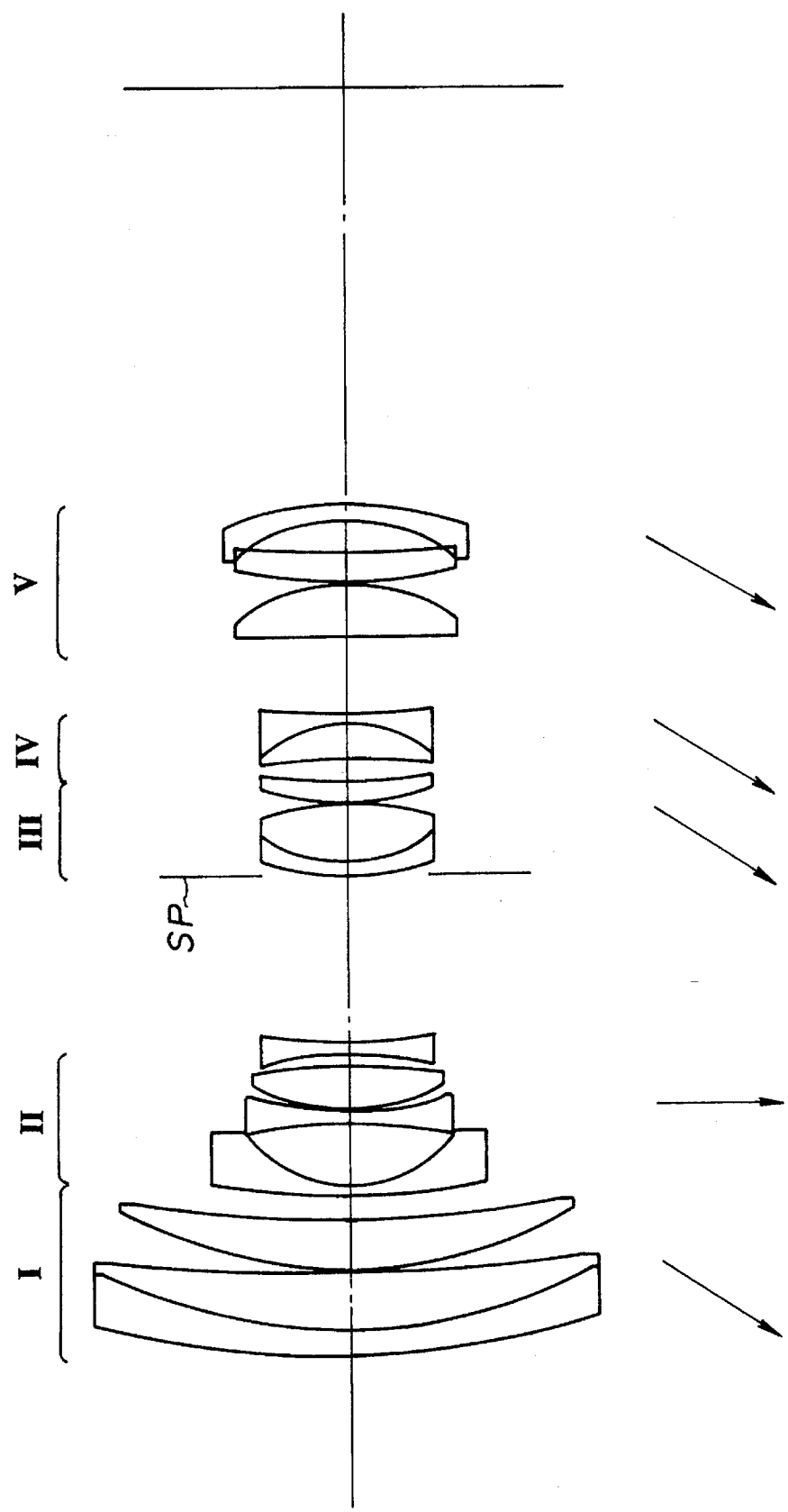
FIG. 5 is a cross-sectional view of a lens according to a second embodiment of the present invention.
Figure 6:
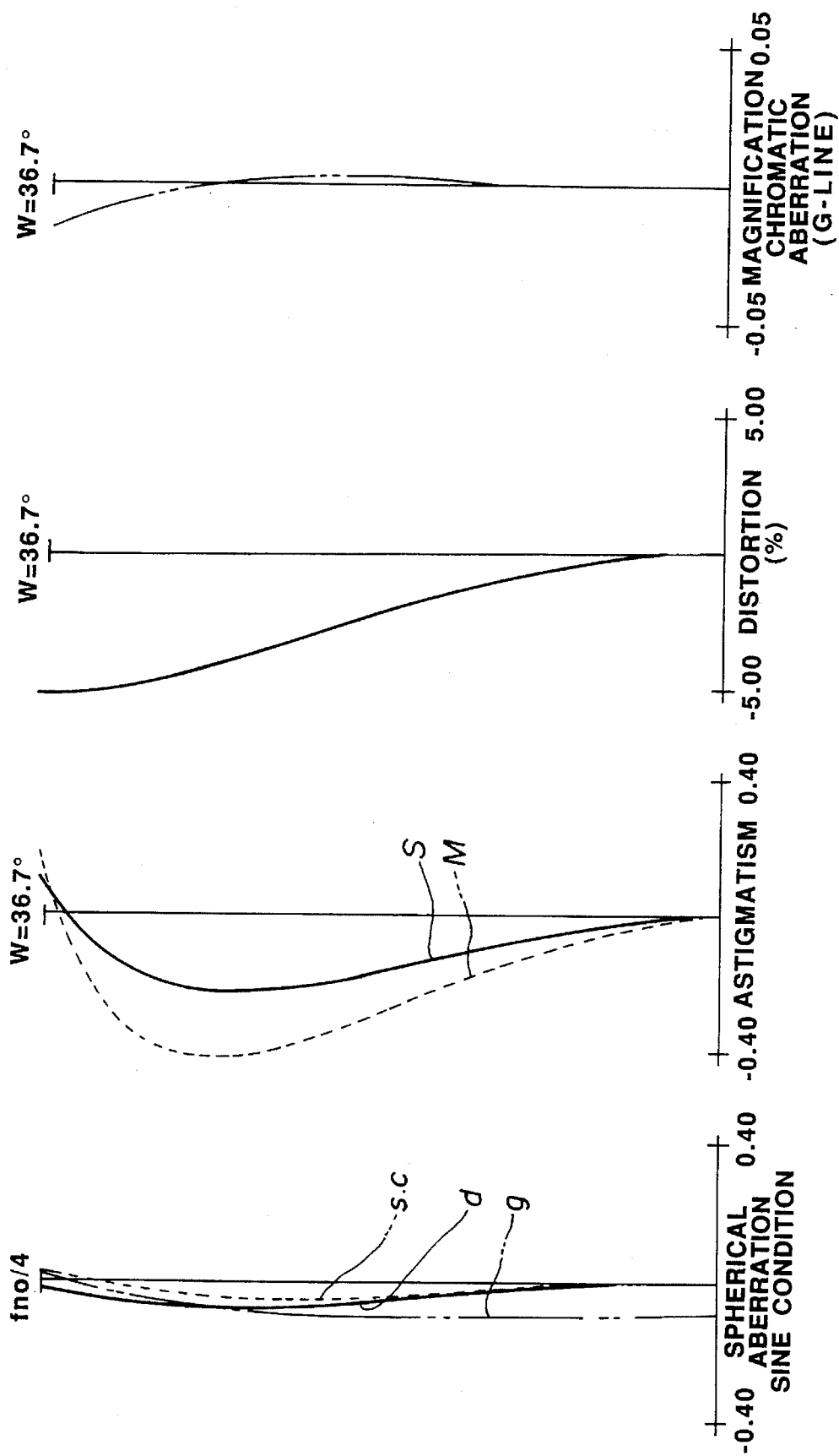
FIG. 6 is a diagram illustrating various kinds of aberrations at a wide-angle end of the lens of the second embodiment.
Figure 7:
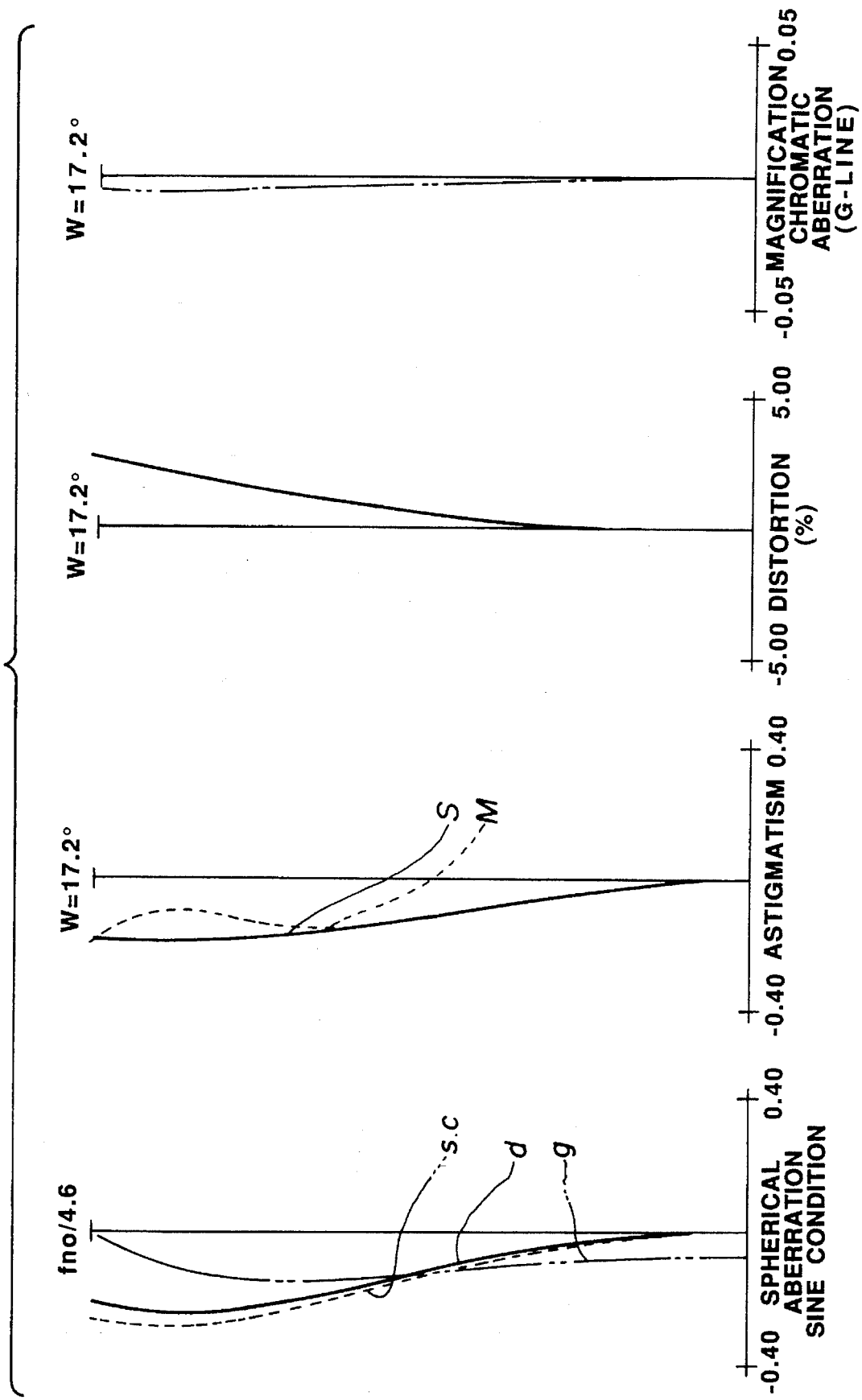
FIG. 7 is a diagram illustrating various kinds of aberrations at an intermediate focal length of the lens of the second embodiment.
Figure 8:
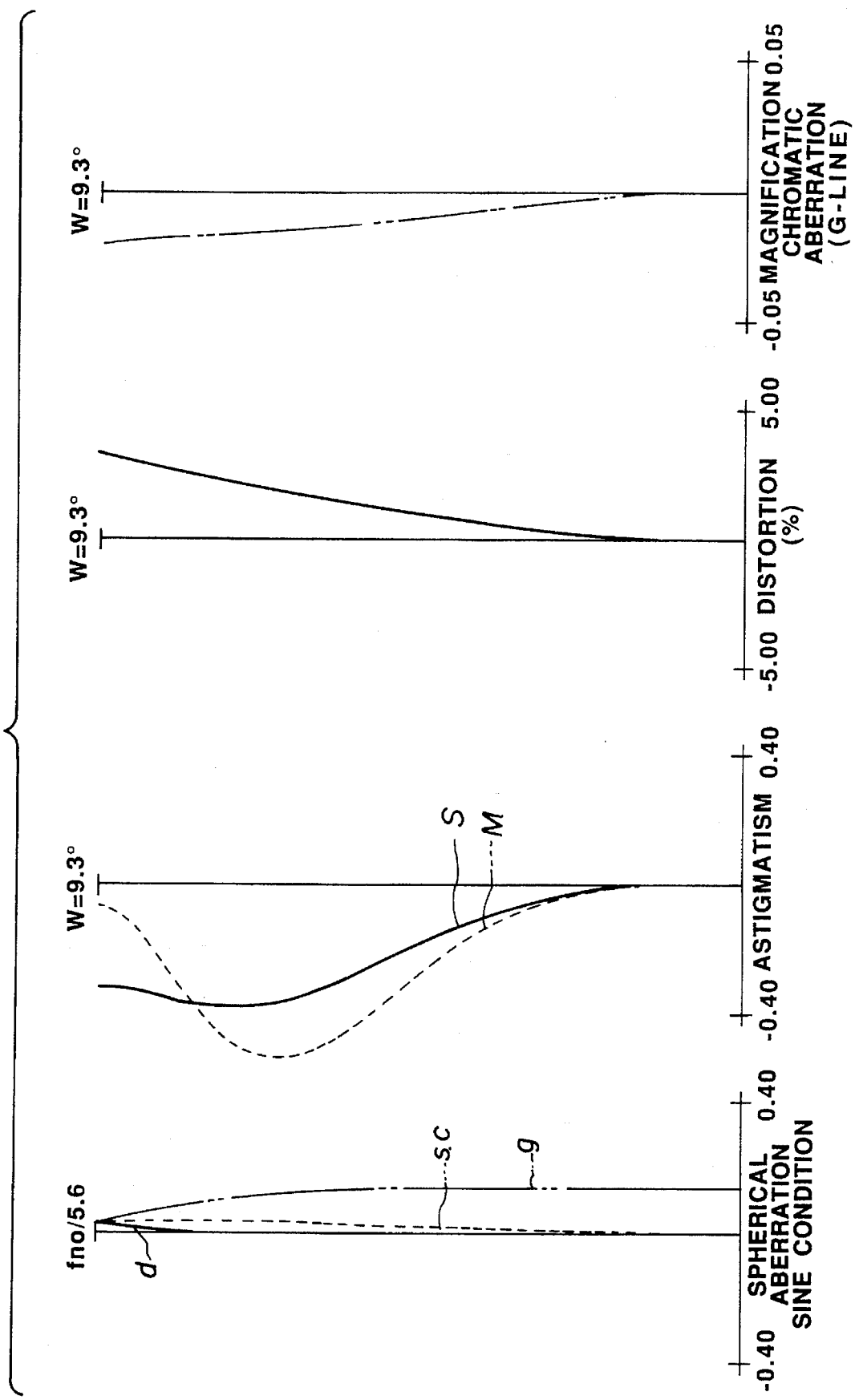
FIG. 8 is a diagram illustrating various kinds of aberrations at a telephoto end of the lens of the second embodiment.
Figure 9:
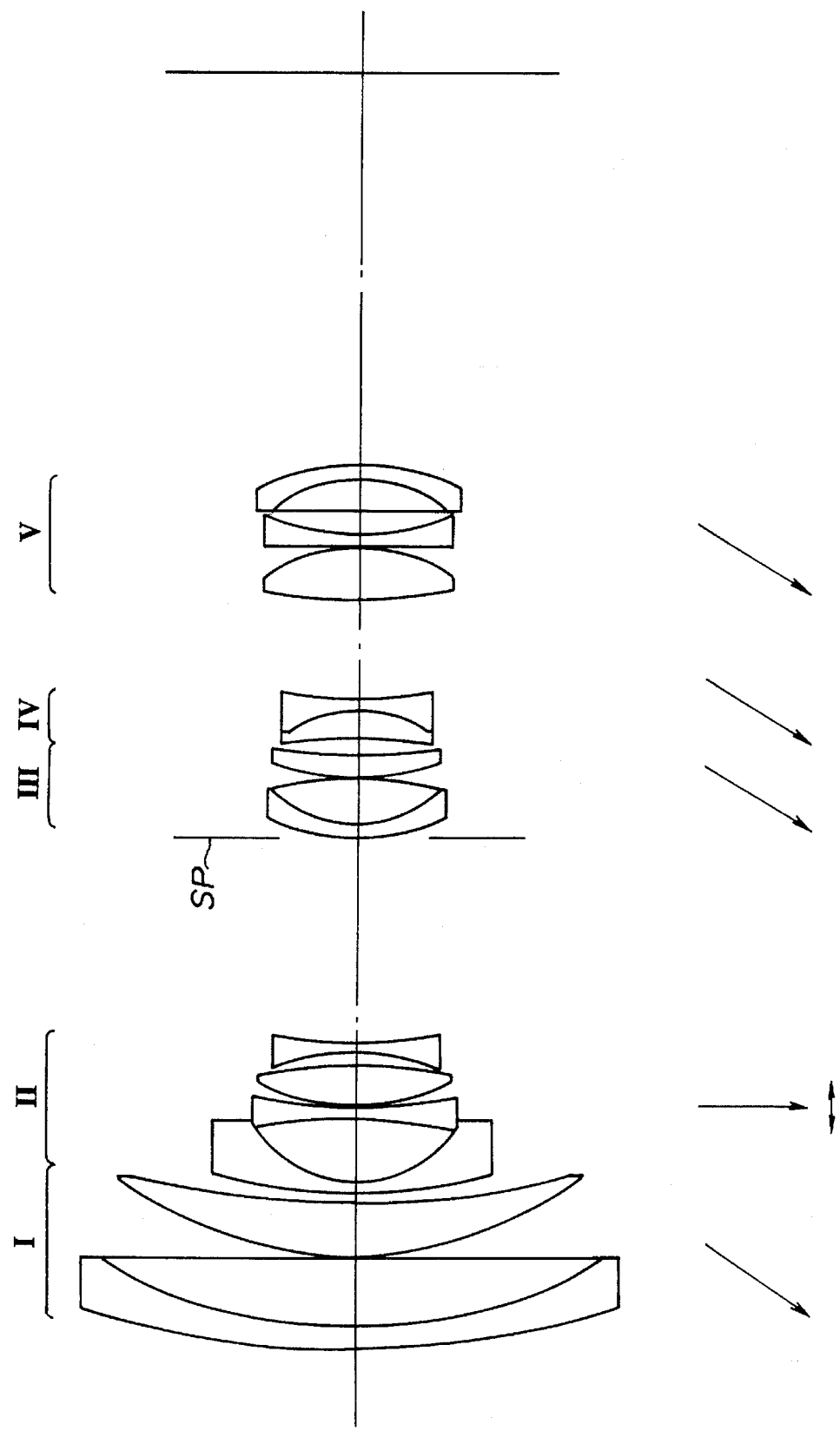
FIG. 9 is a cross-sectional view of a lens according to a third embodiment of the present invention.
Figure 10:
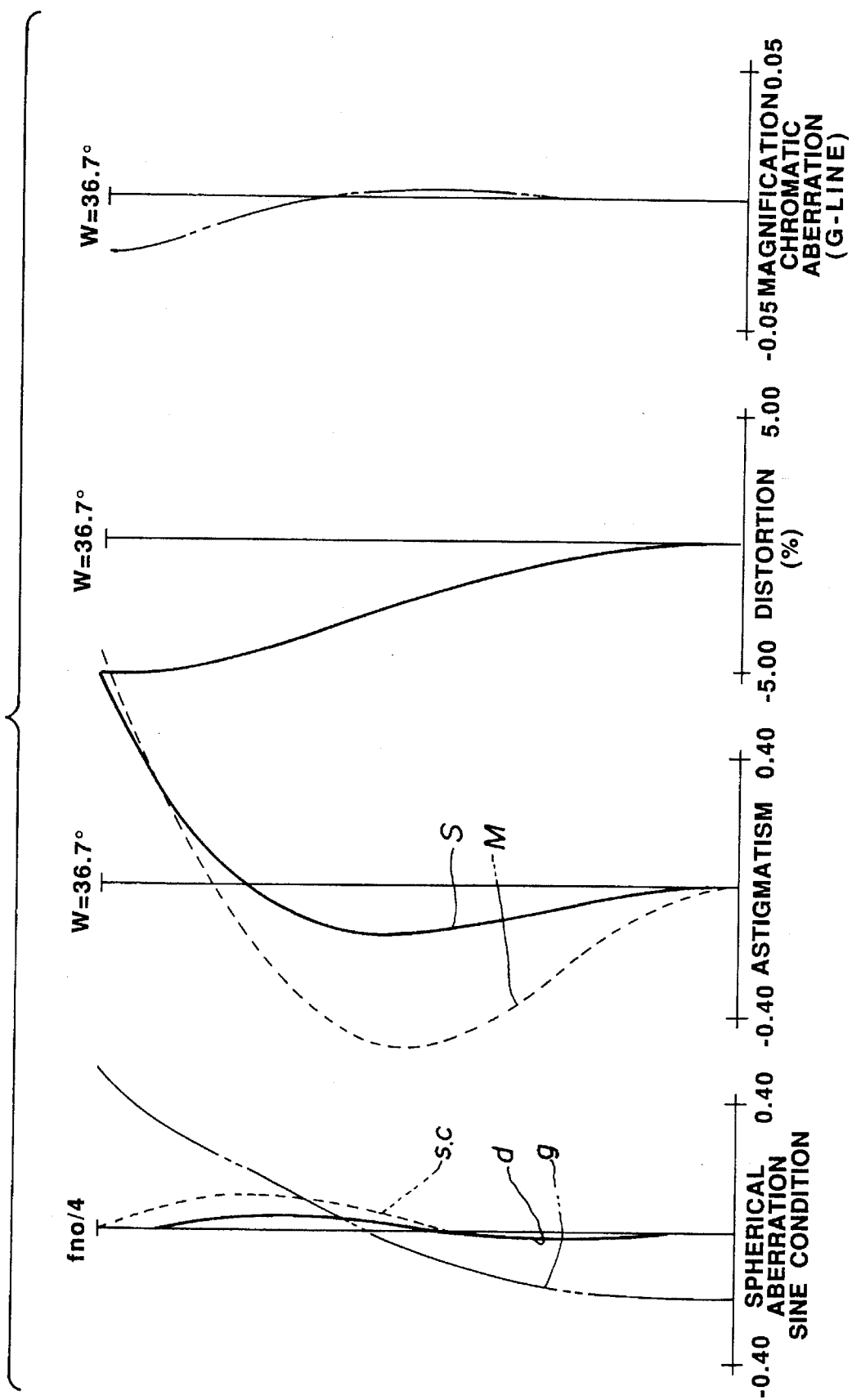
FIG. 10 is a diagram illustrating various kinds of aberrations at a wide-angle end of the lens of the third embodiment.
Figure 11:
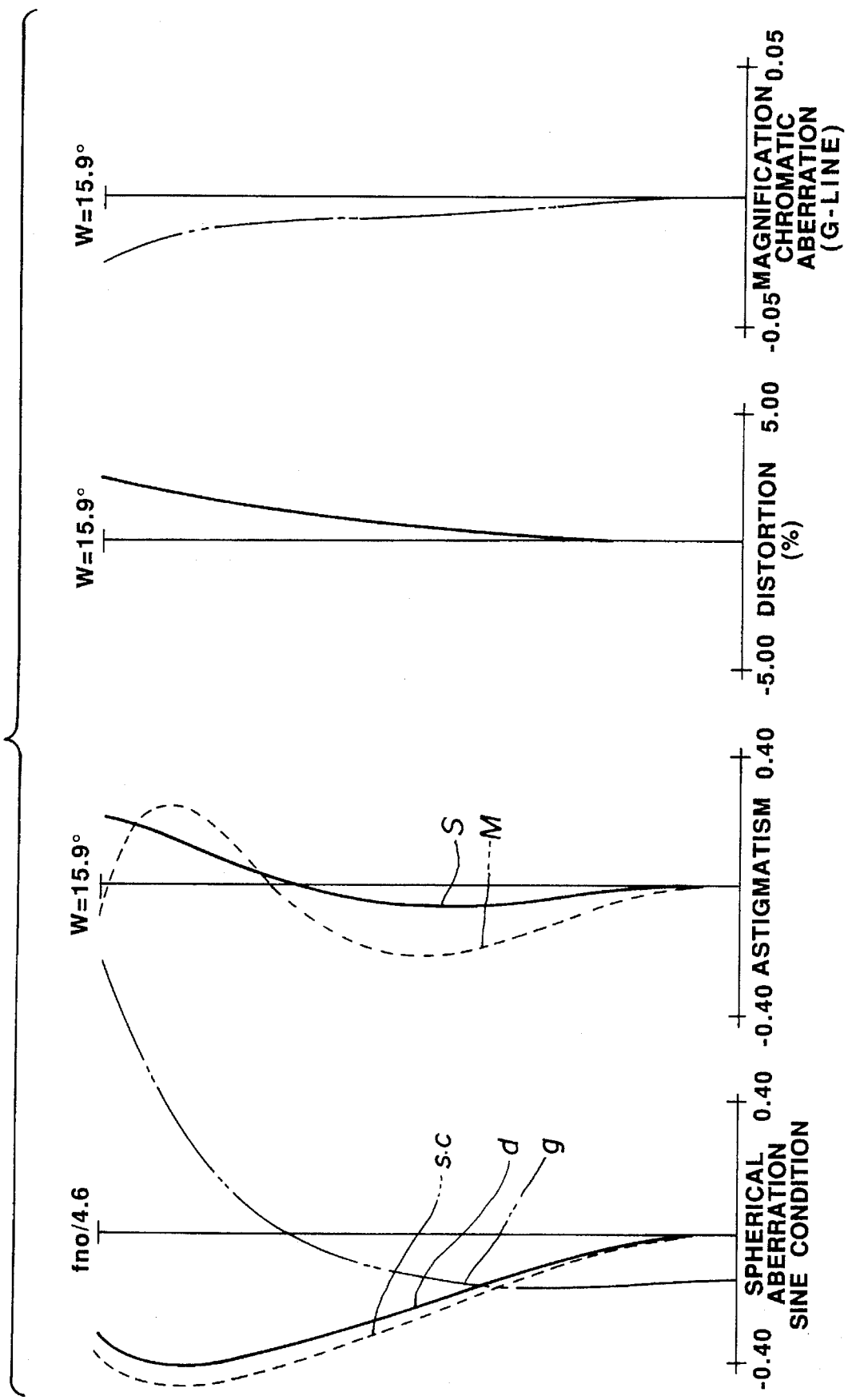
FIG. 11 is a diagram illustrating various kinds of aberrations at an intermediate focal length of the lens of the third embodiment.
Figure 12:
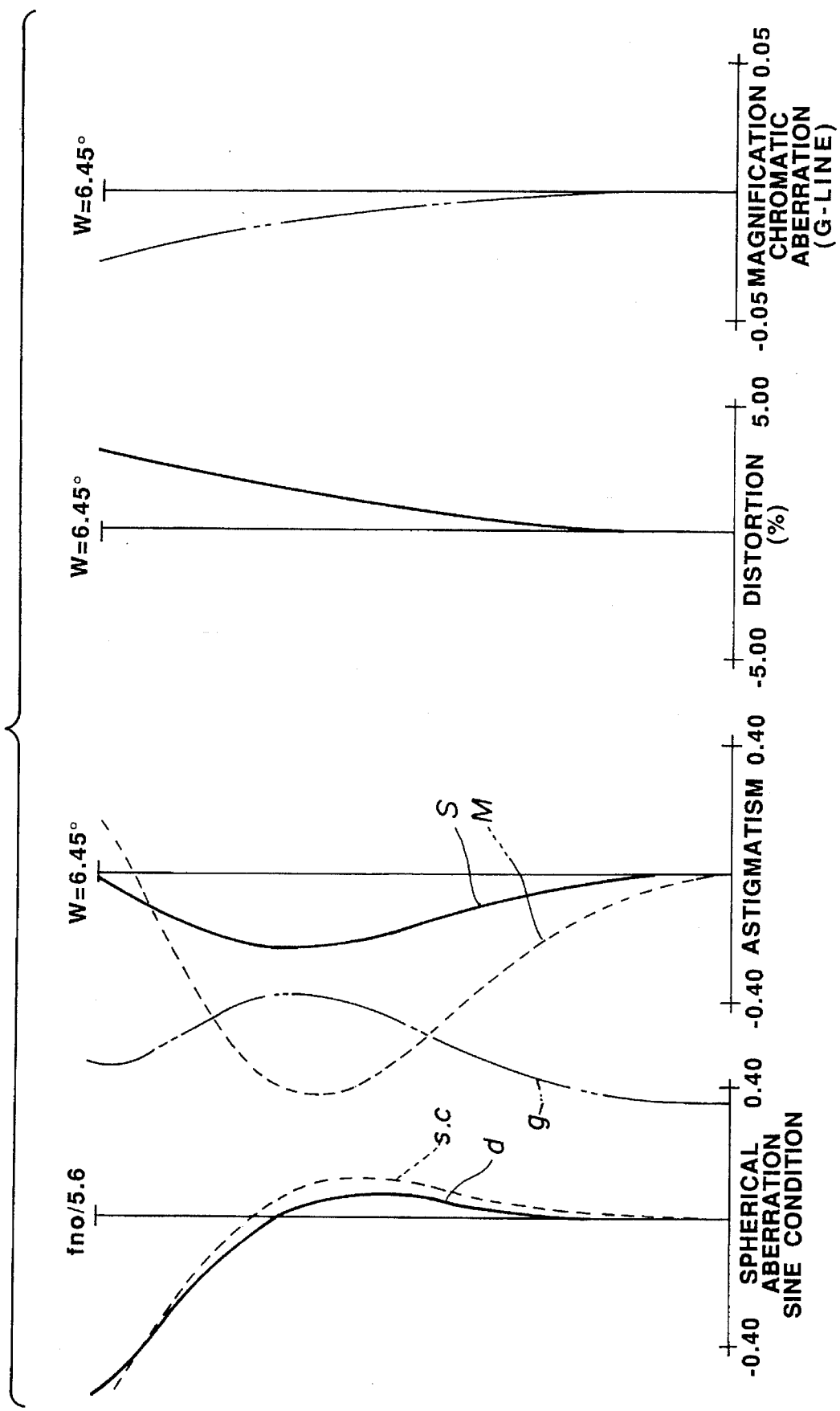
FIG. 12 is a diagram illustrating various kinds of aberrations at a telephoto end of the lens of the third embodiment.

In each of FIGS. 1, 5 and 9, the symbols I, II, III, IV, V and SP represent a first lens group having a positive refractive power; a second lens group having a negative refractive power; a third lens group having a positive refractive power; a fourth lens group having a negative refractive power; a fifth lens group having a positive refractive power, and a diaphragm, respectively, in the order from the object side. Zooming from a wide-angle end to a telephoto end is performed by changing a distance interval between respective lens groups. Focusing is performed by moving the second lens group, which has a relatively small diameter and also is light in weight.

According to the invention, a five group zoom lens also satisfies the following conditional expressions:

$$0.3 < f_1/f_T < 0.8 \tag{1}$$

$$1.2 < Z_2/Z_3 < 3.0 \tag{2}$$

$$0.5 < f_3/f_W < 0.8 \tag{3},$$

where $f_1$ and $f_3$ represent the focal lengths of the first and third lens groups, respectively; $f_W$ and $f_T$ represent the focal lengths at a wide-angle end and at a telephoto end of the lens, respectively; and $Z_2$ and $Z_3$ represent a sharing value for a varying magnification of the second and third lens groups, respectively, that is defined by a ratio of the paraxial lateral magnification at the telephoto end over the paraxial lateral magnification at the wide-angle end.

The meaning of each of these conditional expressions now will be explained.

Expression (1) provides a condition for making the focal length of the first lens group relatively short, and for reducing the entire length of the lens. Expression (1) also indicates a condition for reducing the outer diameter of the lens particularly by reducing the diameter of a light beam incident from the second lens group onto the side of the image at the telephoto end, and for reducing the diameter of the diaphragm. If the focal length of the first lens group is reduced so that the ratio $f_1/f_T$ becomes less than the lower limit value, aberrations, in particular a spherical aberration, at the telephoto end generated in this lens group greatly increase, whereby it becomes difficult to mutually correct the aberrations by the lens groups after the second lens group. If the ratio exceeds the upper limit value, the above-described object of providing a compact lens cannot be achieved. Moreover, the amount of movement of the lens for obtaining a desired varifocal zoom ratio must be increased, whereby it becomes difficult to provide a structure for holding the lens barrel.

Expression (2) indicates that the sharing value of a varying magnification for a second lens group at zooming must be relatively greater than that of a third lens group. This expression has the purpose of increasing the varifocal effect by the second lens group, by providing a short focal length for the first lens group. This condition also has the effects of reducing the burden of the third lens group, which can generate a rather large amount of aberrations, and of not deteriorating the performance of the lens even if the size of the lens is reduced. If the ratio $Z_2/Z_3$ is less than the stated lower limit value, the above-described effects will be reduced. If the ratio $Z_2/Z_3$ exceeds the stated upper limit value, the share of the second lens group becomes too large, and it becomes difficult to correct variations in aberrations during a focusing operation.

Expression (3) indicates a condition for providing an excellent balance between the amount of generation of aberrations and the total length of the lens by providing an appropriate focal length of the third lens group. If the focal length of the third lens group is reduced so that the ratio $f_3/f_W$ becomes less than the stated lower limit value, it becomes difficult to correct generation of aberrations by the third lens group. If the ratio $f_3/f_W$ exceeds the stated upper limit value, the back focus becomes too long, whereby it becomes difficult to reduce the total length of the lens.

In the present embodiments, zooming from the wide-angle end to the telephoto end is performed by moving at least the first, third and fifth lens group as arranged from the object side, and the imaging magnification of the second lens group is set to be greater than −1, so that the second lens group can perform a focusing operation.

Embodiments provided with numerical values meeting the conditions for the present invention now will be shown. In the following embodiments, ri represents the radius of curvature of the i-th lens surface from the side of the object; di is the thickness of the lens or the interval of the air of the i-th item, measured from the object side, and ni and vi are the refractive index and the Abbe number of the i-th lens measured from the object side, respectively.

First Embodiment $f = 29–101.53 \quad fn0 = 1{:}3.5{-}4.6 \quad 2w = 73.4°{-}24.1°$

| | | | | | |
|---|---|---|---|---|---|
| r1 = | 100.573 | d1 = | 2.00 | n1 = | 1.84666 v1 = 23.8 |
| r2 = | 50.509 | d2 = | 5.70 | n2 = | 1.69680 v2 = 55.5 |
| r3 = | 233.318 | d3 = | 0.12 | | |
| r4 = | 45.952 | d4 = | 4.80 | n3 = | 1.71300 v3 = 53.8 |
| r5 = | 130.547 | d5 = | variable | | |
| r6 = | 58.722 | d6 = | 1.20 | n4 = | 1.83400 v4 = 37.2 |
| r7 = | 13.172 | d7 = | 5.73 | | |
| r8 = | −70.164 | d8 = | 1.10 | n5 = | 1.80400 v5 = 46.6 |
| r9 = | 33.861 | d9 = | 0.10 | | |
| r10 = | 22.714 | d10 = | 4.35 | n6 = | 1.84666 v6 = 23.9 |
| r11 = | −52.072 | d11 = | 0.60 | | |
| r12 = | −30.560 | d12 = | 1.10 | n7 = | 1.83481 v7 = 42.7 |
| r13 = | 345.585 | d13 = | variable | | |
| r14 = | (diaphragm) | d14 = | 0.00 | | |
| r15 = | 24.449 | d15 = | 1.20 | n8 = | 1.84666 v8 = 23.8 |
| r16 = | 13.714 | d16 = | 5.85 | n9 = | 1.60311 v9 = 60.7 |
| r17 = | −42.361 | d17 = | 0.12 | | |
| r18 = | 29.244 | d18 = | 2.05 | n10 = | 1.77250 v10 = 49.6 |
| r19 = | 72.044 | d19 = | variable | | |
| r20 = | −51.388 | d20 = | 3.35 | n11 = | 1.75520 v11 = 27.5 |
| r21 = | −12.692 | d21 = | 1.10 | n12 = | 1.80400 v12 = 46.6 |
| r22 = | 87.855 | d22 = | variable | | |
| r23 = | 214.120 | d23 = | 5.45 | n13 = | 1.48749 v13 = 70.2 |
| r24 = | −17.471 | d24 = | 0.12 | | |
| r25 = | 70.487 | d25 = | 2.60 | n14 = | 1.69680 v14 = 55.5 |
| r26 = | −89.327 | d26 = | 3.04 | | |
| r27 = | −18.092 | d27 = | 1.40 | n15 = | 1.84666 v15 = 23.8 |
| r28 = | −58.272 | | | | |

| Focal length | 29.00 | 50.00 | 101.53 |
|---|---|---|---|
| Variable interval | | | |
| d5 | 1.91 | 14.12 | 29.26 |

-continued

First Embodiment

| f = 29–101.53 | fn0 = 1:3.5–4.6 | | 2w = 73.4°–24.1° |
|---|---|---|---|
| d13 | 15.46 | 8.85 | 2.13 |
| d19 | 2.20 | 5.15 | 7.88 |
| d22 | 6.97 | 4.02 | 1.29 |

Second Embodiment f = 29–132.58    fn0 = 1:4–5.6    2w = 73.4°–18.5°

| r1 = | 128.622 | d1 = | 2.00 | n1 = | 1.84666 | v1 = | 23.8 |
|---|---|---|---|---|---|---|---|
| r2 = | 59.168 | d2 = | 6.40 | n2 = | 1.65160 | v2 = | 58.5 |
| r3 = | 6013.165 | d3 = | 0.10 | | | | |
| r4 = | 42.330 | d4 = | 5.50 | n3 = | 1.69680 | v3 = | 55.5 |
| r5 = | 100.826 | d5 = | variable | | | | |
| r6 = | 58.583 | d6 = | 1.20 | n4 = | 1.83400 | v4 = | 37.2 |
| r7 = | 12.947 | d7 = | 6.00 | | | | |
| r8 = | −78.767 | d8 = | 1.10 | n5 = | 1.80400 | v5 = | 46.6 |
| r9 = | 52.766 | d9 = | 0.10 | | | | |
| r10 = | 21.318 | d10 = | 4.20 | n6 = | 1.84666 | v6 = | 23.9 |
| r11 = | −52.841 | d11 = | 1.10 | | | | |
| r12 = | −31.884 | d12 = | 1.10 | n7 = | 1.83481 | v7 = | 42.7 |
| r13 = | 51.054 | d13 = | variable | | | | |
| r14 = | (diaphragm) | d14 = | 0.00 | | | | |
| r15 = | 25.604 | d15 = | 1.20 | n8 = | 1.84666 | v8 = | 23.8 |
| r16 = | 13.831 | d16 = | 5.60 | n9 = | 1.60311 | v9 = | 60.7 |
| r17 = | −33.304 | d17 = | 0.12 | | | | |
| r18 = | 25.084 | d18 = | 2.20 | n10 = | 1.69680 | v10 = | 55.5 |
| r19 = | 53.196 | d19 = | variable | | | | |
| r20 = | −72.832 | d20 = | 3.18 | n11 = | 1.75520 | v11 = | 27.5 |
| r21 = | −13.495 | d21 = | 1.10 | n12 = | 1.80400 | v12 = | 46.6 |
| r22 = | 63.626 | d22 = | variable | | | | |
| r23 = | 102.100 | d23 = | 5.46 | n13 = | 1.48749 | v13 = | 70.2 |
| r24 = | −17.528 | d24 = | 0.12 | | | | |
| r25 = | 66.393 | d25 = | 3.01 | n14 = | 1.60311 | v14 = | 60.7 |
| r26 = | 349.091 | d26 = | 2.90 | | | | |
| r27 = | −15.781 | d27 = | 1.39 | n15 = | 1.84666 | v15 = | 23.8 |
| r28 = | −33.988 | | | | | | |

| Focal length Variable interval | 29.00 | 70.03 | 132.58 |
|---|---|---|---|
| d5 | 1.23 | 21.38 | 33.23 |
| d13 | 18.16 | 8.22 | 1.85 |
| d19 | 1.37 | 5.76 | 8.11 |
| d22 | 8.60 | 4.22 | 1.87 |

Third Embodiment f = 29–191.1    fn0 = 1:4–5.6    2w = 73.4°–12.9°

| r1 = | 103.188 | d1 = | 2.00 | n1 = | 1.84666 | v1 = | 23.8 |
|---|---|---|---|---|---|---|---|
| r2 = | 59.995 | d2 = | 7.00 | n2 = | 1.65160 | v2 = | 58.5 |
| r3 = | 889.650 | d3 = | 0.10 | | | | |
| r4 = | 42.569 | d4 = | 5.60 | n3 = | 1.69680 | v3 = | 55.5 |
| r5 = | 104.164 | d5 = | variable | | | | |
| r6 = | 61.312 | d6 = | 1.20 | n4 = | 1.83400 | v4 = | 37.2 |
| r7 = | 12.504 | d7 = | 6.30 | | | | |
| r8 = | −61.700 | d8 = | 1.10 | n5 = | 1.83481 | v5 = | 42.7 |
| r9 = | 47.146 | d9 = | 0.10 | | | | |
| r10 = | 21.303 | d10 = | 4.70 | n6 = | 1.84666 | v6 = | 23.9 |
| r11 = | −38.509 | d11 = | 1.10 | | | | |
| r12 = | −25.283 | d12 = | 1.10 | n7 = | 1.83481 | v7 = | 42.7 |
| r13 = | 60.506 | d13 = | variable | | | | |
| r14 = | (diaphragm) | d14 = | 0.00 | | | | |
| r15 = | 22.060 | d15 = | 1.20 | n8 = | 1.84666 | v8 = | 23.8 |
| r16 = | 12.687 | d16 = | 5.00 | n9 = | 1.60311 | v9 = | 60.7 |
| r17 = | −33.066 | d17 = | 0.10 | | | | |
| r18 = | 33.615 | d18 = | 2.20 | n10 = | 1.69680 | v10 = | 55.5 |
| r19 = | 79.777 | d19 = | variable | | | | |
| r20 = | −85.039 | d20 = | 3.18 | n11 = | 1.75520 | v11 = | 27.5 |
| r21 = | −13.516 | d21 = | 1.10 | n12 = | 1.80400 | v12 = | 46.6 |
| r22 = | 55.715 | d22 = | variable | | | | |

-continued

Third Embodiment f = 29–191.1  fn0 = 1:4–5.6  2w = 73.4°–12.9°

| | | | | | | | |
|---|---|---|---|---|---|---|---|
| r23 = | 43.214 | d23 = | 5.30 | n13 = | 1.51633 | v13 = | 64.2 |
| r24 = | −18.478 | d24 = | 0.12 | | | | |
| r25 = | −965.113 | d25 = | 1.40 | n14 = | 1.77250 | v14 = | 49.6 |
| r26 = | 29.121 | d26 = | 2.20 | n15 = | 1.60311 | v15 = | 60.7 |
| r27 = | 1153.094 | d27 = | 3.60 | | | | |
| r28 = | −14.543 | d28 = | 1.39 | n16 = | 1.84666 | v16 = | 23.8 |
| r29 = | −25.140 | | | | | | |

| Focal length | 29.00 | 76.91 | 191.11 |
|---|---|---|---|
| Variable interval | | | |
| d5 | 1.08 | 21.90 | 36.35 |
| d13 | 18.16 | 10.56 | 1.80 |
| d19 | 1.61 | 6.89 | 9.73 |
| d22 | 10.00 | 4.71 | 1.88 |

As described above, according to the present invention, a high varifocal ratio is provided, and the following advantages, for example, still can be obtained:

1. The total zoom lens length is reduced.
2. The outer diameter of the zoom lens is reduced.
3. By making the second lens group a focusing lens, the weight of the focus lens can be reduced, and a high-speed focusing operation can be performed.
4. Since no moving lens group portion is present outside the lens, an accidental, or unintentional, focus state change by a hand contact will not occur.
5. Since the first lens group does not rotate during a focusing operation, the user can easily operate, for example, a polarizing filter.
6. A petal-type lens hood can be mounted.
7. Deterioration of optical performance of the zoom lens is suppressed, even though the size of the lens has been reduced.

While the present invention has been described with respect to what presently are considered to be the preferred embodiments, it is understood that the invention is not limited to the disclosed embodiments. To the contrary, the present invention is intended to cover various modifications and equivalent arrangements included within the spirit and scope of the appended claims. The following claims are to be accorded with a broad interpretation, so as to encompass all such modifications and equivalent structures and functions.

What is claimed is:

1. A zoom lens comprising a first lens group having a positive refractive power; a second lens group having a negative refractive power; a third lens group having a positive refractive power; a fourth lens group having a negative refractive power; and a fifth lens group having a positive refractive power; said first through fifth lens groups being arranged in this order from the object side wherein a varifocal zooming operation is performed by changing a distance interval between respective lens groups, and said zoom lens satisfies the following conditional expressions:

$0.3 < f_1/f_T < 0.8$ $1.2 < Z_2/Z_3 < 3.0$ $0.5 < f_3/f_W < 0.8$, where $f_1$ and $f_3$ represent the focal lengths of said first and third lens groups, respectively, $f_W$ and $f_T$ represent focal lengths of said lens at a wide-angle end and at a telephoto end, respectively; and $Z_2$ and $Z_3$ represent a sharing value for a varying magnification of said second and third lens groups, respectively, that is defined by a ratio of the paraxial lateral magnification at the telephoto end over the paraxial lateral magnification at the wide-angle end.

2. A zoom lens according to claim 1, wherein a focusing operation is performed by moving said second lens group.

3. A zoom lens comprising: a first lens group having a positive refractive power; a second lens group having a negative refractive power; a third lens group having a positive refractive power; a fourth lens group having a negative refractive power; and a fifth lens group having a positive refractive power; said first through fifth lens groups being arranged in this order from the object side, wherein a zooming operation is performed by changing distance interval between respective lens groups; wherein a focusing operation is performed by moving said second lens group and said zoom lens satisfies the following conditional expressions:

$1.2 < Z_2/Z_3 < 3.0$, where $Z_2$ and $Z_3$ represent a sharing value of a varying magnification of said second and third lens group, respectively, that is defined by a ratio of the paraxial lateral magnification at the telephoto end over the paraxial lateral magnification at the wide-angle end.

4. A zoom lens according to claim 3, wherein said zoom lens satisfies the following conditional expressions:

$0.3 < f_1/f_T < 0.8$ $1.2 < Z_2/Z_3 < 3.0$ $0.5 < f_3/f_W < 0.8$, where $f_1$ and $f_3$ represent the focal lengths of said first and third lens groups, respectively, $f_W$ and $f_T$ represent the focal lengths of said lens at a wide-angle end and at a telephoto end, respectively.

5. A zoom lens comprising:
   a first lens group having a positive refractive power;
   a second lens group having a negative refractive power;
   a third lens group having a positive refractive power;
   a fourth lens group having a negative refractive power; and
   a fifth lens group having a positive refractive power, said first through fifth lens groups being arranged in order from the object side, wherein a zooming operation is performed by changing an air space between respective lens groups, and a focusing operation is performed by moving said second lens group, and wherein zooming from a wide-angle end to a telephoto end is performed by moving at least said first lens group to an object side of said zoom lens.

6. A zoom lens according to claim 5, wherein said zoom lens satisfies the following conditional expressions:

$0.3 < f_1/f_T < 0.8$ $1.2 < Z_2/Z_3 < 3.0$ $0.5 < f_3/f_W < 0.8$, where $f_1$ and $f_3$ represent the focal lengths of said first lens group and said third lens group, respectively, $f_W$ and $f_T$ represent focal lengths of said zoom lens at the wide-angle end and at the telephoto end, respectively, and $Z_2$ and $Z_3$ represent a sharing value for a varying magnification of said second lens group and said third lens group, respectively, that is defined by a ratio of the paraxial lateral magnification at the telephoto end over the paraxial lateral magnification at the wide-angle end.

* * * * *

UNITED STATES PATENT AND TRADEMARK OFFICE
CERTIFICATE OF CORRECTION

PATENT NO. : 5,528,427
DATED : June 18, 1996
INVENTOR(S) : TSUNEFUMI TANAKA, ET AL.

It is certified that error appears in the above-indentified patent and that said Letters Patent is hereby corrected as shown below:

On the title page: ITEM

[63] RELATED U.S. APPLICATION DATA:

"957,099," should read --957,009,--.

COLUMN 2:

Line 17, "telesphoto" should read --telephoto--.

COLUMN 7:

Line 50, "comprising" should read --comprising:--.

Signed and Sealed this

Fifteenth Day of October, 1996

Attest:

BRUCE LEHMAN

Attesting Officer

Commissioner of Patents and Trademarks